(12) United States Patent
Sassatelli et al.

(10) Patent No.: US 8,382,402 B2
(45) Date of Patent: Feb. 26, 2013

(54) DRILLING APPARATUS

(75) Inventors: John Matthew Sassatelli, Valley Falls, NY (US); Mark Edward Burnett, Barton, NY (US); Jay Waylett, Albany, NY (US); Roger Dean Eglin, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 1074 days.

(21) Appl. No.: 12/335,749

(22) Filed: Dec. 16, 2008

(65) Prior Publication Data

US 2010/0150676 A1    Jun. 17, 2010

(51) Int. Cl.
*B23B 45/14* (2006.01)

(52) U.S. Cl. .................................. 408/110; 408/135

(58) Field of Classification Search .................. 408/135, 408/141, 128, 92, 239 R, 110
See application file for complete search history.

(56) References Cited

U.S. PATENT DOCUMENTS

| | | | |
|---|---|---|---|
| 762,647 A * | 6/1904 | Mullinnix | 408/135 |
| 2,154,745 A * | 4/1939 | Hedgpeth | 408/128 |
| 2,578,995 A * | 12/1951 | Emrick | 408/136 |
| 2,625,845 A * | 1/1953 | Thelning | 408/135 |
| 3,162,091 A * | 12/1964 | Keller | 409/144 |
| 3,762,830 A * | 10/1973 | Pettigrew | 408/135 |
| 3,803,927 A * | 4/1974 | Lawler | 74/89.31 |
| 3,817,648 A * | 6/1974 | Miller | 408/59 |
| 3,977,806 A * | 8/1976 | Kinoshita | 408/141 |
| 4,199,285 A * | 4/1980 | Bader et al. | 409/206 |
| 6,264,405 B1 * | 7/2001 | Parviainen et al. | 408/1 R |
| 6,361,254 B1 * | 3/2002 | Vesterlund et al. | 408/1 R |
| 7,381,018 B2 * | 6/2008 | Zepic et al. | 409/234 |
| 7,988,388 B2 * | 8/2011 | Suzuki et al. | 408/124 |

* cited by examiner

*Primary Examiner* — Daniel Howell
*Assistant Examiner* — Paul M Janeski
(74) *Attorney, Agent, or Firm* — Ernest G. Cusick; Gary M. Hartman; Domenica N. S. Hartman

(57) ABSTRACT

A drilling apparatus capable of having a minimal axial length to permit its use within limited confines. The drilling apparatus includes a housing with a housing bore and a first housing end, a spindle rotatably supported within the housing bore, bearing elements within the housing bore and surrounding the spindle to rotatably support the spindle within the housing, and a drive unit for rotating the spindle. The spindle is configured to secure a shank of a drill bit at a first end thereof exposed at the first housing end, and the drive unit is transversely offset from an axis of rotation of the spindle.

20 Claims, 8 Drawing Sheets

DRILLING APPARATUS

BACKGROUND OF THE INVENTION

The present invention generally relates to drilling equipment, and more particularly to a drilling apparatus capable of having a minimal axial length to permit its use within limited confines.

The axial length of a drilling apparatus along the axis of its drill bit can at times exceed the space available for some drilling applications. For example, the inlet pipes of steam turbine nozzle boxes may be on the order of about six inches (about 15 cm), which severely limits the size of the drilling equipment that can be placed between inlet pipe pairs for the purpose of drilling holes in their opposing parallel faces. While various small pneumatic, hydraulic and electric drills have been developed that are sufficiently small to fit between steam turbine inlet pipes, they typically lack the power, speed and/or thrust force required to accomplish the drilling operation due to the hardness of the inlet pipe material.

BRIEF DESCRIPTION OF THE INVENTION

The present invention provides a drilling apparatus capable of having a minimal axial length to permit its use within limited confines.

According to a first aspect of the invention, the drilling apparatus includes a housing comprising a housing bore and a first housing end, a spindle rotatably supported within the housing bore, bearing means within the housing bore and surrounding the spindle so as to rotatably support the spindle within the housing, and drive means for rotating the spindle. The spindle comprises means for securing a shank of a drill bit at a first end thereof exposed at the first housing end, and the drive means is transversely offset from an axis of rotation of the spindle.

The construction of the drilling apparatus allows for the drilling of holes in confined locations as a result of the manner in which the spindle is supported around its circumference and the drive means is transverse offset from the spindle, which in combination minimizes the length of the drilling apparatus along the spindle axis and, therefore, the rotational axis of a drill bit mounted in the spindle. The drilling apparatus also permits the use of a relative short drill bit, with a sufficient portion of the bit being supported by the spindle to contribute sufficient strength and stiffness to the drill bit and spindle assembly for drilling hard materials. The manner in which the spindle is supported and the transverse offset of the drive means also enables the drill bit to be rotated at sufficient rotational speeds and power levels to accomplish drilling of hard materials, including metal alloys of the type used to form steam nozzle inlet pipes of steam turbines.

Other aspects and advantages of this invention will be better appreciated from the following detailed description.

DETAILED DESCRIPTION OF THE INVENTION

Figure 1:
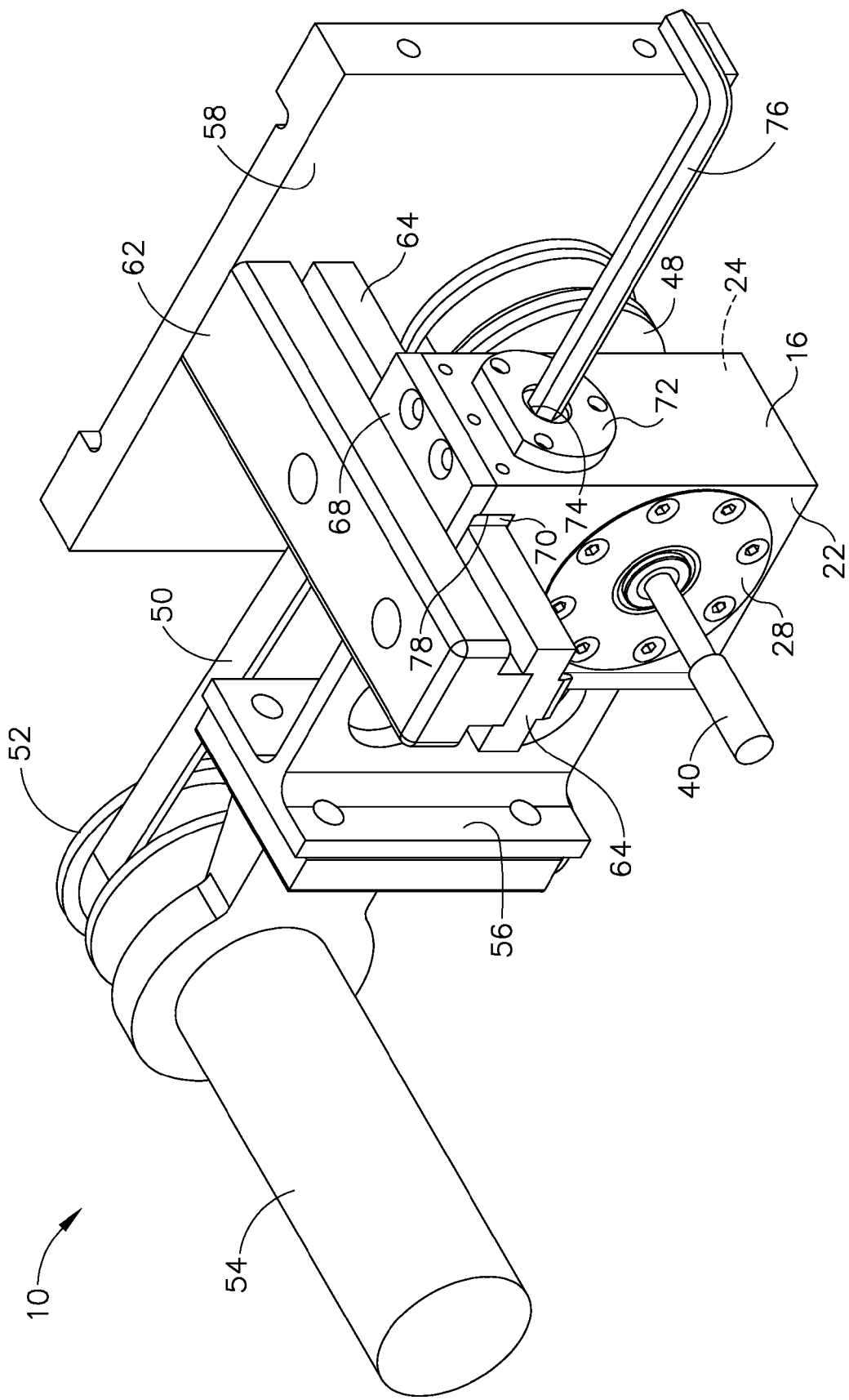
FIG. 1 is a perspective view of a drilling apparatus in accordance with an embodiment of this invention.

FIG. 1 depicts a drilling apparatus 10 capable of drilling holes in confined locations that prevent the use of conventional drilling equipment. As an example, FIGS. 2 through 8 shows the drilling apparatus 10 between a pair of steam nozzle inlet pipes 12 of a steam turbine and oriented for drilling into a surface 14 of one of the pipes 12. The spacing between the pipes 12 can be as little as six inches (about 15 cm) or less, which precludes the use of common drilling equipment when attempting to drill into either of the pipe surfaces 14 between the pipes 12. While the drilling apparatus 10 of this invention is particularly suitable for the application represented in FIGS. 2 through 8, it should be evident that the apparatus 10 is versatile and capable of use in a wide variety of applications, all of which are within the scope of this invention.

The embodiment of the drilling apparatus 10 shown in FIGS. 1 through 8 is represented as comprising a spindle housing 16 within which a spindle 18 is rotatably mounted with bearings 20. The spindle 18 is shown as fitting radially within the inner races of two bearings 20, such that each bearing 20 circumferentially surrounds the spindle 18. The housing 16 has oppositely-disposed first and second ends 22 and 24 and a bore 26 therebetween. The bore 26 is shown closed by a plate 28 at the first end 22 of the housing 16, allowing for the spindle 18 and bearings 20 to be installed and removed from the bore 26 through an opening 23 at the first end 22 of the housing 16. The spindle 18 is mounted within the bore 26 so that its axis of rotation 30 coincides with the longitudinal axis of the bore 26. The spindle 18 has a first end 32 at which an opening 36 is defined by a bore 38 within the spindle 18, and a second end 34 that projects through an opening 25 at the second end 24 of the housing 16. Shaft seals 27 are provided within the plate 28 and at the second end 24 of the housing 16 to enable a lubricant to be sealed within the bore 26.

The spindle 18 is adapted to secure a drill bit 40 from the end 32 of the spindle 18 exposed at the first end 22 of the housing 16. While the bit 40 could be coupled to the spindle 18 in accordance with various known techniques, the bit 40 is preferably mounted to the spindle 18 by placing and securing its shank within the spindle bore 38. The bit 40 is preferably secured by a tapered shape defined by the bore 38, for example, a #1 Morse taper, though other tapers and other means for securing the drill bit 40 are foreseeable and within the scope of the invention. As known in the art, a Morse taper (as well as other types of machine tapers) permits the drill bit 40 to be slipped into the spindle 18 and utilize the pressure of the drill bit 40 against the workpiece (e.g., the inlet pipe 12) being drilled to secure the bit 40 within the spindle 18 through friction between the tapered spindle bore 38 and the shank of the bit 40, which preferably has a complementary taper, instead of relying on splines or keys to transmit torque from the spindle 18 to the drill bit 40.

The bearings 20 supporting the spindle 18 within the housing 16 must have sufficient capacity to support loads imposed on the spindle 18 at rotational speeds required for the drilling operation. In the configuration shown in FIG. 7, the bearings 20 also support axial loads imposed on the spindle 18. For this purpose, the bearings 20 are placed on either side of an annular flange 42 that protrudes from the circumference of the spindle 18 and abuts the inner races of the bearings 20. Various bearings capable of performing in this manner are commercially available, an example being TIMKEN 05185 tapered roller bearings (or an equivalent) commercially available from the Timken Company.

Figure 7:
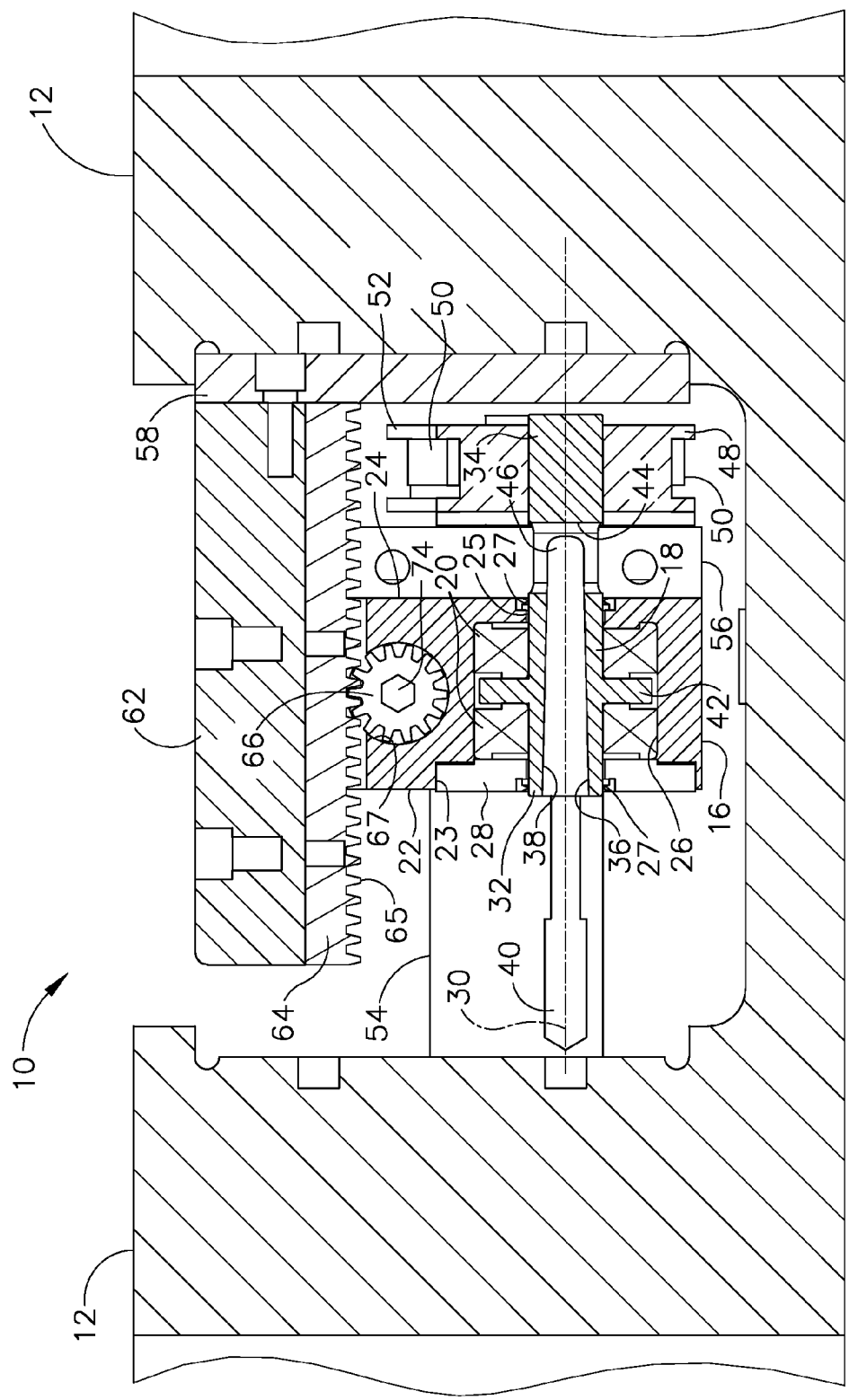
FIG. 7 is a cross-sectional view of the drilling apparatus along line 7-7 of FIG. 6.

The spindle 18 is shown in FIG. 7 as having a transverse slot 44 adjacent its second end 34 and outside the housing 16. The slot 44 intersects the spindle bore 38 to allows access to the end of the otherwise blind bore 38, and serves as a knockout cross-hole to facilitate removal of the drill bit 40. The bit 40 can be configured to have a tang 46 that protrudes into the slot 44 when the bit 40 is fully inserted and secured within the spindle bore 38. A particular aspect of the invention is that, as seen in FIG. 7, the bearings 20 are axially positioned on the spindle 18 such that the tapered bore 38 of the spindle 18 extends entirely through the bearings 20. With this configuration, the slot 44 serving as a knockout hole to the bore 38 and drill bit 40 is axially beyond the bearings 20 and located outside the housing 16 and opposite the opening 36 in the spindle 18 through which the drill bit 40 is inserted. In effect, the bearings 20 centrally support the spindle 18 to allow access to both ends 32 and 34 of the spindle 18.

The spindle 18 is driven (rotated) within the housing 16 by a drive system transversely offset from the spindle axis 30. In the embodiment shown in the figures, a suitable drive system is represented as a pulley system comprising two sheaves 48 and 52, a drive belt 50, and a motor 54. The sheave 48 can be coupled to the second end 34 of the spindle 18, for example, by press-fitting, keying, or any other suitable manner. In turn, the drive belt 50 is driven by the sheave 52 mounted on the motor 54, whose drive axis is approximately parallel to the spindle axis 30. A guard (not shown) of any suitable configuration may be used to protectively enclose the belt 50 and sheaves 48 and 52. The motor 54 can be of any suitable type capable of delivering the desired levels and ranges of torques and speeds to the spindle 18 through the selected ratio of the sheaves 48 and 52. As a nonlimiting example, a suitable motor 54 is a hydraulic motor having a variable speed capability of about 80 to about 474 rpms, and a power rating of about 0.4 to about 4 hp (about 0.3 to about 3 kW). While the spindle 18 is belt-driven in the figures, other systems for driving the spindle 18 are also within the scope of the invention, including gear systems.

Figure 2:
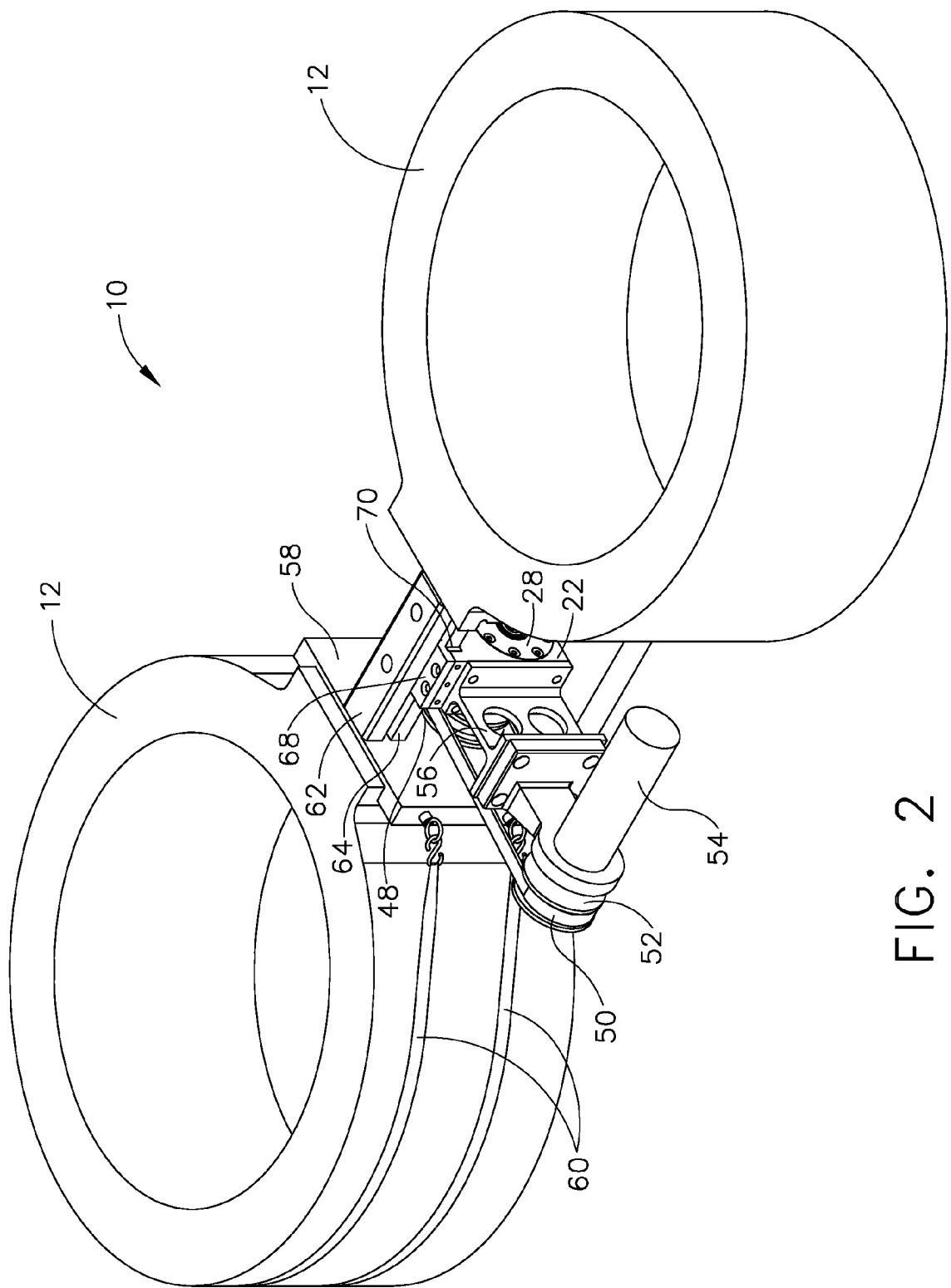
FIGS. 2 and 3 are two opposing perspective views showing the apparatus of FIG. 1 mounted between two steam nozzle inlet pipes of a steam turbine.
Figure 3:
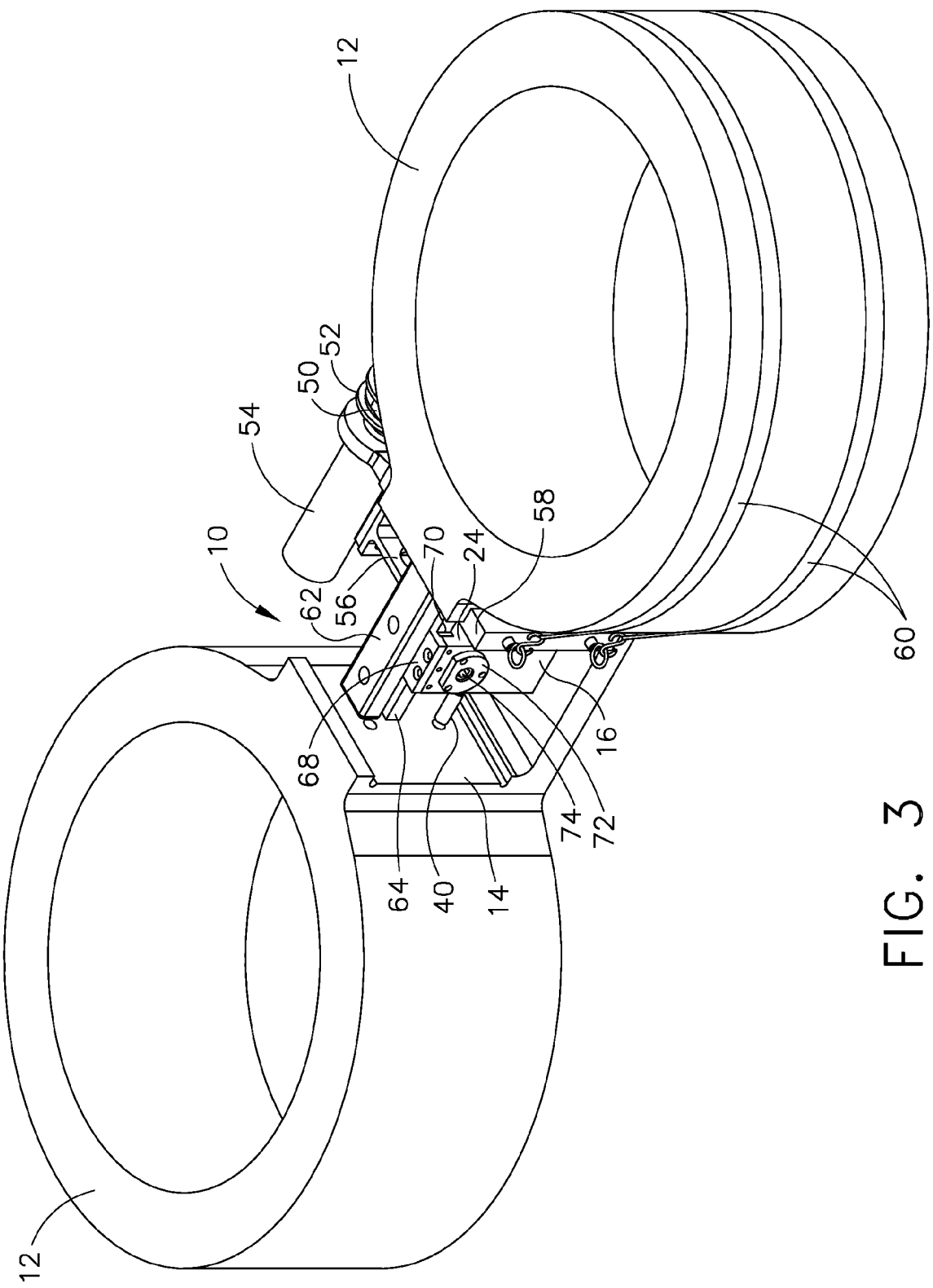
Figure 6:
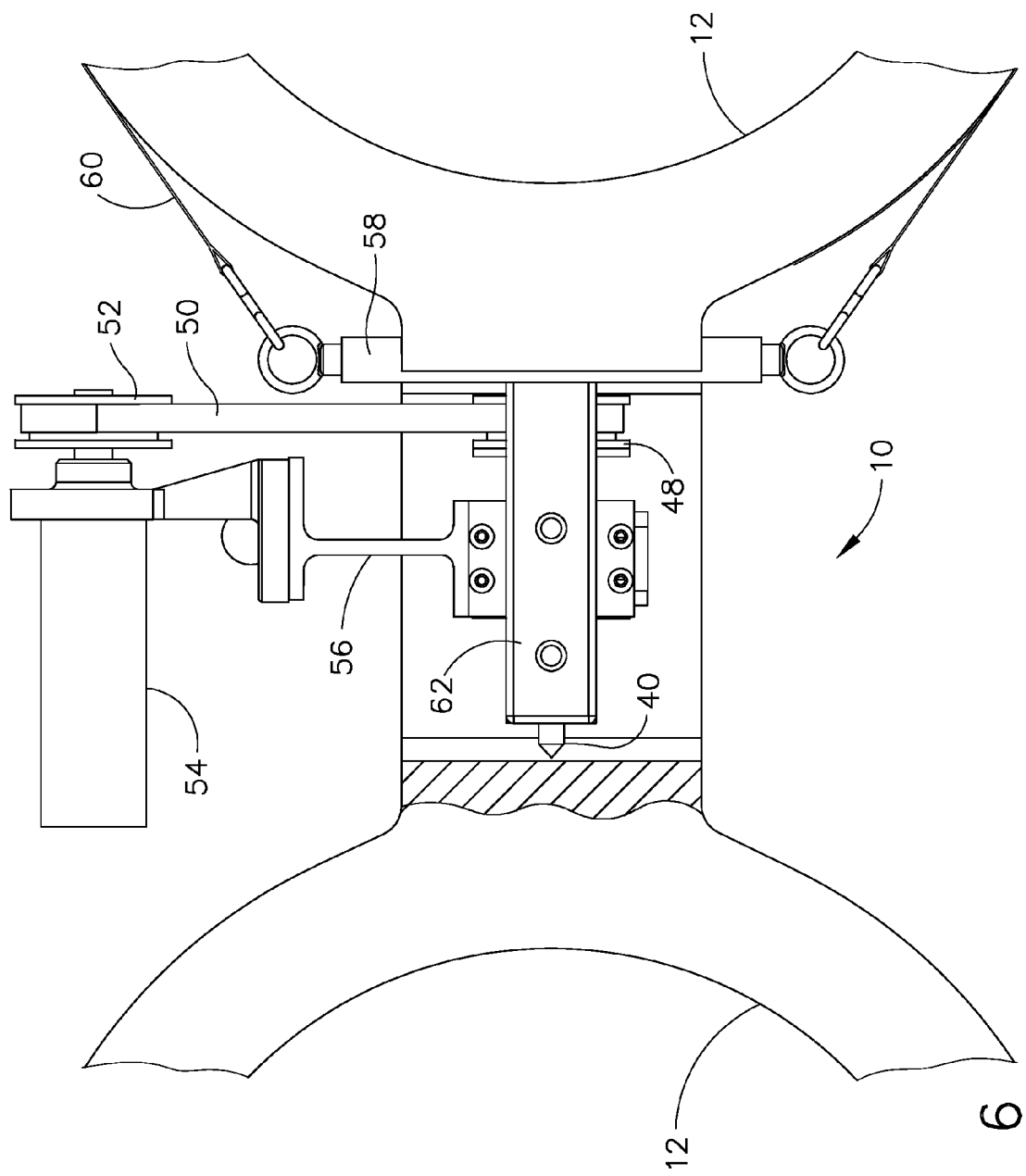
FIG. 6 is a top view of the apparatus mounted between the two steam nozzle inlet pipes of FIGS. 2 through 5.

The motor 54 is coupled to the housing 16 with a beam 56 that, as seen in FIGS. 1, 2 and 6, can be configured to promote rigidity and strength while minimizing weight. The beam 56 orients the motor 54 so that the motor drive axis is parallel to the spindle axis 30 and the drill bit 40 mounted therein. As such, the axis of the motor 54 is not in line with the spindle axis 30, as is the case with conventional drilling equipment.

The housing 16, its internal components, the motor 54, and its drive components are represented as being supported from a mounting plate 58. The mounting plate 58 is oriented transverse to the spindle axis 30, and is shown in FIGS. 1 through 7 as approximately perpendicular to the spindle axis 30, though a perpendicular orientation is not required. As shown in FIGS. 2 through 6, the mounting plate 58 is shown secured to the inlet pipe 12 with straps 60, though other means of securing the plate 58 to an object are also foreseeable and within the scope of this invention. From FIGS. 2 through 6, it can be seen that the plate 58 and straps 60 are adapted to secure and orient the drilling apparatus 10 to the inlet pipe 12 (or another workpiece structure) so that the first end 22 of the housing 16 and the opening 36 in the spindle 18 through which the drill bit 40 is received face away from the pipe 12 to which the apparatus 10 is secured, and face the second inlet pipe 12 to be drilled by the apparatus 10.

A strongback 62 is secured to the plate 58 opposite the pipe 12, and extends above and approximately parallel to the spindle axis 30. The function of the strongback 62 is to rigidly support a rack 64 with gear teeth 65 facing the spindle housing 16 and meshing with gear teeth on a pinion 66 rotatably supported within a bore 67 within the housing 16. The axis of rotation of the pinion 66 is transverse to the spindle axis 30, such that rotation of the pinion 66, with its teeth meshed with the rack 64, causes the housing 16 and its spindle 18 to move toward and away from the plate 58 in a direction approximately parallel to the spindle axis 30. In this manner, the pinion 66 allows an operator to advance or retract the drill bit 40 relative to a workpiece being machined, such as the inlet pipe 12 opposite the pipe 12 to which the drilling apparatus 10 is attached in FIGS. 2 through 6.

Figure 8:
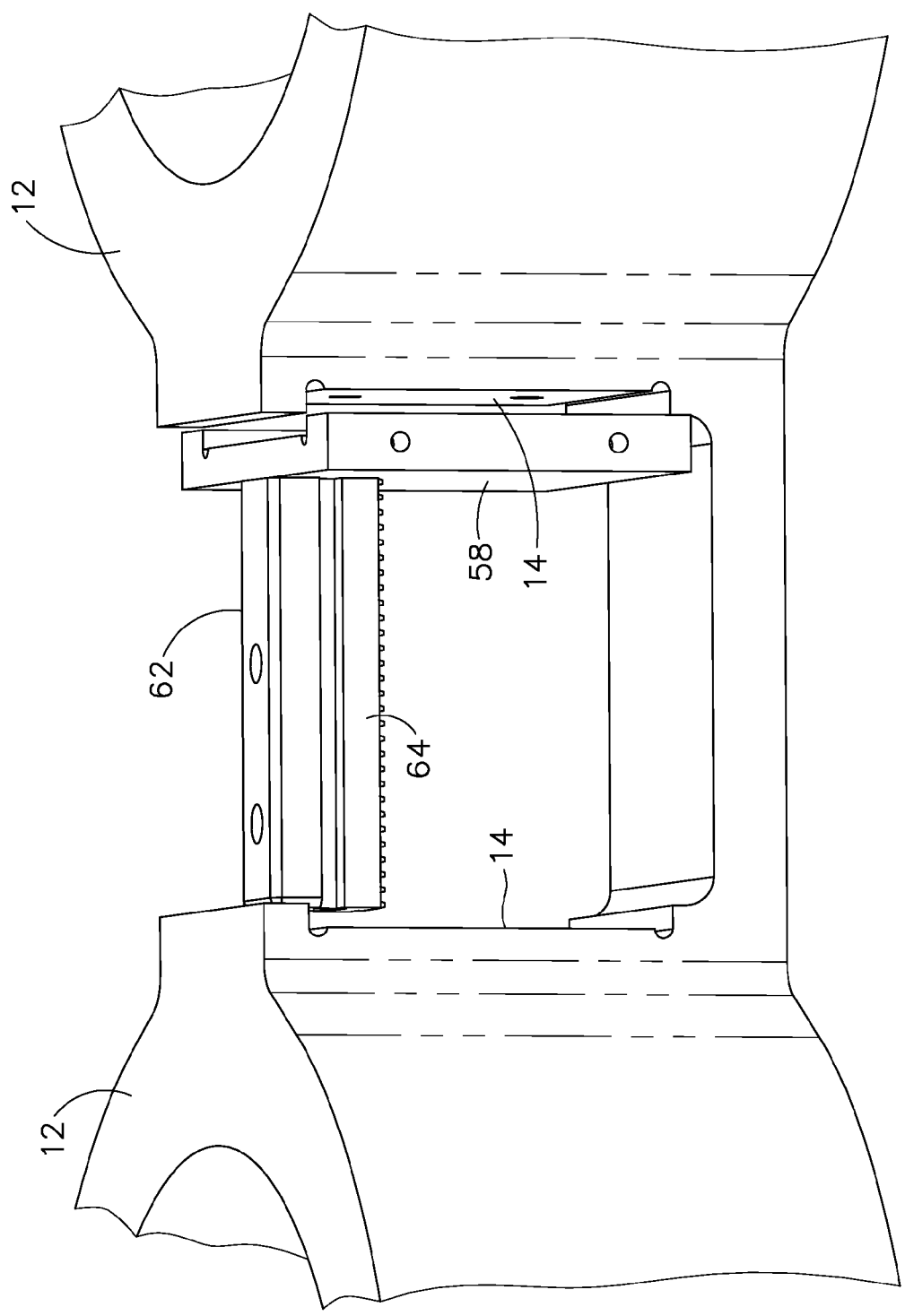
FIG. 8 shows a subassembly of the apparatus of FIG. 1 installed between the two steam nozzle inlet pipes in preparation for installing the remainder of the apparatus and completing the assembly shown in FIGS. 2 through 7.

The rack 64 is shown in FIGS. 1 and 7 as being slidably disposed within a stepped channel 78 that accommodates the rack 64 as well as its teeth 65. The rack 64 is secured to the housing 16 with a pair of rack holders 68, and gib keys 70 provide bearing surfaces that contact the rack 64 as it translates through the channel 78 in the housing 16. This arrangement enables the rack and pinion gear system 64 and 66 to provide a stabilizing force for the spindle 18 while in operation, as well as a mechanical advantage that resists thrusts developed during operation of the drilling apparatus 10. This arrangement also permits the installation of the apparatus 10 as subassemblies, as represented in FIG. 8. In particular, the mounting plate 58, strongback 62, and rack 64 can first be positioned and secured to the inlet pipe 12 as shown in FIG. 8, after which the remainder of the apparatus 10, including the housing 16 (and its internal components), beam 56, and drive system 48 through 54 can be positioned and secured as a second subassembly by mating the channel 78 with the rack 64 and using the rack holders 68 to secure the rack 64 within the channel 78.

Figure 4:
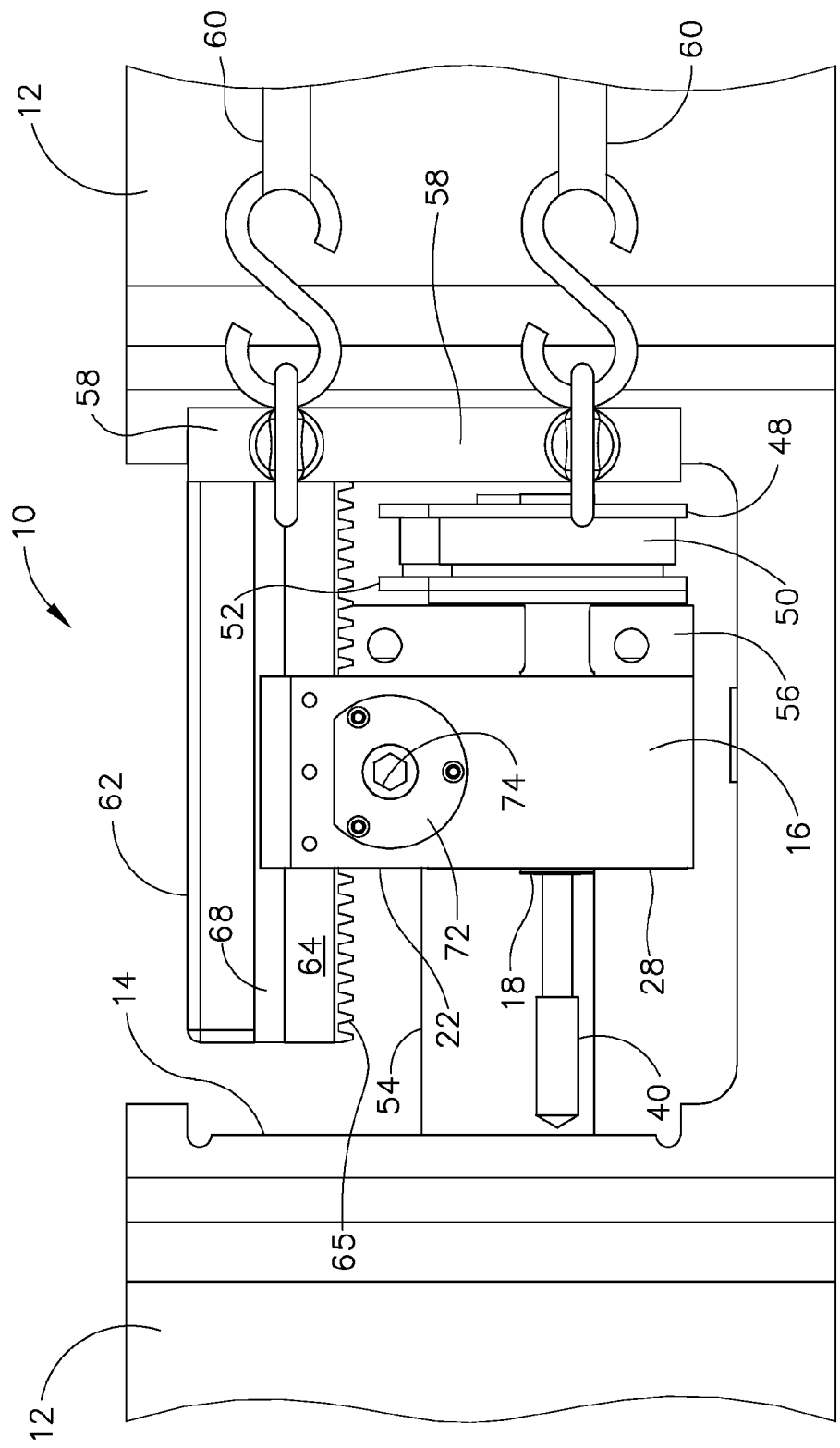
FIGS. 4 and 5 are two opposing side views showing the apparatus mounted between the two steam nozzle inlet pipes of FIGS. 2 and 3.
Figure 5:
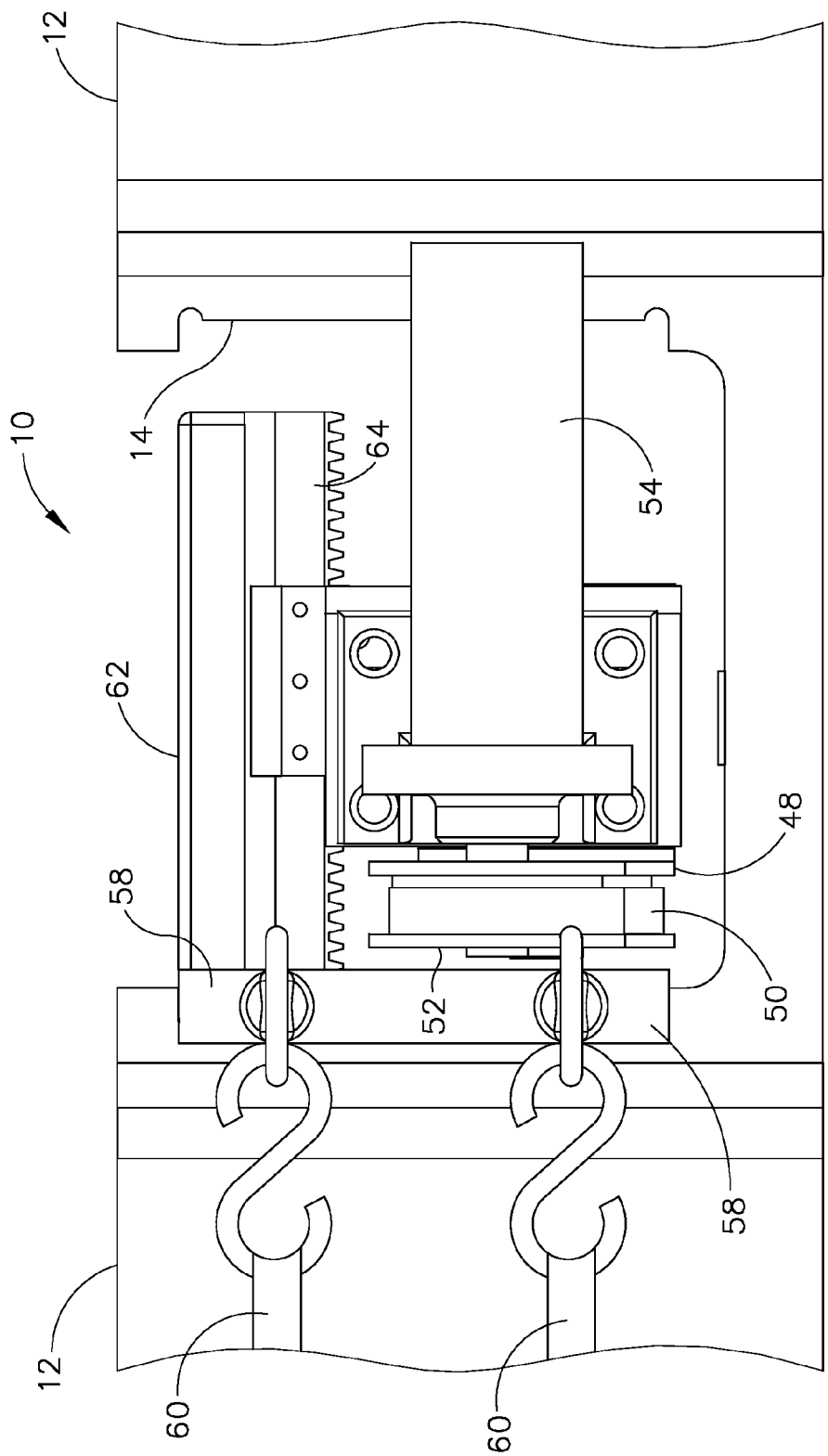

Access to the pinion 66 is provided through an opening in a bushing 72 that supports the shaft of the pinion 66. In FIGS. 1 and 4, a hexagonal socket 74 formed in the end of the pinion shaft serves as a drive key for the pinion 66. An allen wrench or other suitable tool (not shown) can be engaged with the socket 74 to permit manual rotation of the pinion 66, though other means for rotating the pinion 66 are foreseeable, including computer-controlled drive motors.

In view of the foregoing, the bulk of the components required to support and operate the spindle 18, including the housing 16, motor 54, rack 64, and pinion 66, are located outboard of the bearings 20 that support the spindle 18, instead of being inline with the spindle 18 as is the conventional practice.

Various materials can be used in the construction of the drilling apparatus 10, including aluminum and steels such as carbon steels, hot rolled steels and hardenable steels, nonlimiting examples of which include ASTM A36 and AISI 4340. The design options for choosing materials to construct the apparatus 10 are well within the abilities with those of ordinary skill in the art, and therefore are not described in any detail here.

While the invention has been described in terms of a specific embodiment, it is apparent that other forms could be adopted by one skilled in the art. For example, the physical configuration of the apparatus 10, its individual components, and the manner in which they are assembled could differ from what is represented in the figures, and materials and processes other than those noted could be used. Therefore, the scope of the invention is to be limited only by the following claims.

The invention claimed is:

1. A drilling apparatus configured to be mounted between first and second workpiece structures, the drilling apparatus comprising:
   a housing comprising oppositely-disposed first and second housing ends and a housing bore therebetween;
   a spindle rotatably supported within the housing bore, the spindle comprising means for securing a shank of a drill bit to the spindle at a first end thereof exposed at the first housing end, the spindle further comprising a flange that protrudes from a circumference of the spindle between the first end thereof and an oppositely-disposed second end thereof;
   bearing means within the housing bore and surrounding the spindle so as to rotatably support the spindle within the housing, the bearing means being disposed on either side of the flange of the spindle and abutting the flange to support axial loads imposed on the spindle;
   drive means for rotating the spindle, the drive means being transversely offset in a radial direction from an axis of rotation of the spindle;
   a support structure attached to the housing and supporting the drive means therefrom;
   a mounting structure adapted for securing the drilling apparatus to the first workpiece structure, the mounting structure being axially spaced from the second housing end and configured to orient the housing relative to the first and second workpiece structures so that the housing and the mounting structure are between the first and second workpiece structures and the first housing end and the shank securing means face away from the first workpiece structure toward the second workpiece structure; and
   means coupled to the mounting structure and the housing for moving the housing, the support structure and the drive means in unison toward and away from the mounting structure in a direction parallel to the axis of rotation of the spindle.

2. The drilling apparatus according to claim 1, wherein the bearing means comprises a pair of bearing members separated by and axially engaging the flange of the spindle.

3. The drilling apparatus according to claim 1, wherein the shank securing means of the spindle comprises a tapered bore within the spindle and disposed on the axis of rotation of the spindle;

4. The drilling apparatus according to claim 3, wherein the bearing means are axially positioned on the spindle such that the tapered bore of the spindle extends through the bearings.

5. The drilling apparatus according to claim 4, wherein the spindle comprises a transverse slot that intersects the tapered bore at a location on the spindle axially beyond the bearing means, outside the housing, and opposite the first end in the spindle.

6. The drilling apparatus according to claim 1, wherein the drive means comprises a sheave mounted on the spindle.

7. The drilling apparatus according to claim 1, wherein the drilling apparatus comprises:
   a first subassembly comprising the mounting structure and the moving means, the first subassembly defining a maximum axial length of the drilling apparatus along the axis of rotation of the spindle; and
   a second subassembly comprising the support structure, the drive means, and the housing containing the spindle and bearing means.

8. A method of installing the drilling apparatus of claim 7, the method comprising:
   mounting the first subassembly between the first and second workpiece structures by securing the mounting structure to the first workpiece structure; and then
   mounting the second subassembly to the first subassembly by coupling the housing to the moving means.

9. The drilling apparatus according to claim 1, wherein the moving means comprises a rack and pinion assembly.

10. The drilling apparatus according to claim 9, wherein the moving means further comprises a strongback secured to the mounting structure and extending therefrom parallel to the axis of rotation of the spindle, and wherein the rack and pinion assembly comprises a gear rack slidably secured to the strongback and a pinion rotatably supported by the housing.

11. The drilling apparatus according to claim 7, wherein the first and second workpiece structures comprise a pair of nozzle box inlet pipes of a steam turbine, the drilling apparatus is mounted between the pair of nozzle box inlet pipes and the mounting structure secures the drilling apparatus to one of the nozzle box inlet pipes.

12. A drilling apparatus configured to be mounted between first and second workpiece structures, the drilling apparatus comprising:
   a housing comprising a first housing bore having a longitudinal axis and defining first and second housing openings at oppositely-disposed first and second housing ends of the housing;
   a spindle rotatably supported within the first housing bore for rotation on the longitudinal axis of the first housing bore, the spindle having a spindle bore therein that defines a spindle opening at a first spindle end of the spindle and exposed at the first housing end of the housing, the spindle having a second spindle end protruding from the second housing end of the housing, the spindle having an annular flange that protrudes from a circumference of the spindle between the first and second spindle ends, the spindle bore and spindle opening being configured to receive a shank of a drill bit and the spindle bore comprising means for securing the shank of the drill bit to the spindle;
   bearing means within the first housing bore and surrounding the spindle so as to rotatably support the spindle within the housing, the bearing means being disposed on either side of the annular flange of the spindle and abutting the annular flange to support axial loads imposed on the spindle;
   means coupled to the second spindle end for rotating the spindle within the housing;
   a motor for driving the rotating means, the motor being transversely offset from the longitudinal axis of the first housing bore;
   a support structure attached to the housing and supporting the drive means therefrom;
   a mounting plate adapted for securing the drilling apparatus to the first workpiece structure, the mounting plate being axially spaced from the second housing end and adapted for orienting the housing relative to the first and second workpiece structures so that the housing and the mounting plate are between the first and second workpiece structures and the first housing end and the shank securing means face away from the first workpiece structure toward the second workpiece structure; and
   means coupled to the mounting plate and the housing for moving the housing, the support structure and the drive means in unison toward and away from the mounting plate in a direction parallel to the axis of rotation of the spindle;

wherein the mounting structure and the moving means define a maximum axial length of the drilling apparatus along the axis of rotation of the spindle.

13. The drilling apparatus according to claim 12, wherein and the bearing means comprises a pair of bearing members separated by and axially engaging the annular flange of the spindle.

14. The drilling apparatus according to claim 12, wherein the shank securing means of the spindle comprises a taper defined by the spindle bore.

15. The drilling apparatus according to claim 14, wherein the bearing means are axially positioned on the spindle such that the spindle bore extends through the bearings.

16. The drilling apparatus according to claim 15, wherein the spindle comprises a transverse slot that intersects the spindle bore at a location on the spindle axially beyond the bearing means, outside the housing, and adjacent the second spindle end protruding from the second housing end of the housing.

17. The drilling apparatus according to claim 12, wherein the drilling apparatus comprises:

a first subassembly comprising the mounting plate and the moving means; and
a second subassembly comprising the support structure, the motor, the rotating means, and the housing containing the spindle and bearing means.

18. The drilling apparatus according to claim 12, wherein the moving means comprises a rack and pinion assembly.

19. The drilling apparatus according to claim 18, wherein the moving means further comprises a strongback secured to the mounting plate and extending therefrom parallel to the axis of rotation of the spindle, and wherein the rack and pinion assembly comprises a gear rack slidably secured to the strongback and a pinion rotatably supported by the housing.

20. The drilling apparatus according to claim 12, wherein the first and second workpiece structures comprise a pair of nozzle box inlet pipes of a steam turbine, the drilling apparatus is mounted between the pair of nozzle box inlet pipes and the mounting plate is secured to a first of the nozzle box inlet pipes so that the first housing end and the spindle opening face away from the first nozzle box inlet pipe.

* * * * *